United States Patent
Jaeker et al.

(10) Patent No.: US 9,685,773 B2
(45) Date of Patent: Jun. 20, 2017

(54) GUIDING DEVICE

(71) Applicant: igus GmbH, Cologne (DE)

(72) Inventors: Thilo-Alexander Jaeker, Sankt Augustin (DE); Christian Barthen, Cologne (DE)

(73) Assignee: igus GmbH, Cologne (DE)

( * ) Notice: Subject to any disclaimer, the term of this patent is extended or adjusted under 35 U.S.C. 154(b) by 334 days.

(21) Appl. No.: 14/374,372

(22) PCT Filed: Jan. 24, 2013

(86) PCT No.: PCT/EP2013/051353
§ 371 (c)(1),
(2) Date: Jul. 24, 2014

(87) PCT Pub. No.: WO2013/110713
PCT Pub. Date: Aug. 1, 2013

(65) Prior Publication Data
US 2015/0001022 A1    Jan. 1, 2015

(30) Foreign Application Priority Data

Jan. 24, 2012   (DE) .................... 20 2012 000 614 U

(51) Int. Cl.
| H02G 11/00 | (2006.01) |
| F16G 13/16 | (2006.01) |
| F16L 3/26  | (2006.01) |

(52) U.S. Cl.
CPC ............. *H02G 11/00* (2013.01); *F16G 13/16* (2013.01); *F16L 3/26* (2013.01); *H02G 11/006* (2013.01)

(58) Field of Classification Search
CPC ...... F16G 13/16; H02G 11/00; H02G 11/006; F16L 3/26
(Continued)

(56) References Cited

U.S. PATENT DOCUMENTS 3,779,003 A * 12/1973 Boissevain ............. F16G 13/16
                                                                  248/49
5,178,247 A *  1/1993 Vagaggini ............... F16L 3/015
                                                                 191/12 C
(Continued)

FOREIGN PATENT DOCUMENTS

DE      29613678 U1   9/1996
DE      10253267 A1   5/2004
(Continued)

OTHER PUBLICATIONS

English language PCT International Search Report mailed Sep. 17, 2013, received in corresponding PCT Application No. PCT/EP13/51353, 4 pgs.

(Continued)

*Primary Examiner* — Zachary Kuhfuss
(74) *Attorney, Agent, or Firm* — Grossman Tucker Prerreault & Pfleger, PLLC

(57) ABSTRACT

The invention relates to a guiding device for a line, in particular a power chain (12), which can be turned over in such a way that a section (upper run) (16) of the power chain can be positioned above another section (lower run) (14) of the power chain and the upper run and the lower run are connected to each other by an arched section (18), wherein the guiding device has resting surfaces and lateral guiding surfaces and is provided with retaining elements (22) arranged at distances one another in the direction of travel, to which retaining elements guide rails (24) are attached preferably by means of clip connections, which guide rails bridge the distances between the retaining elements and support the lower run and/or the upper run of the line or power chain.

15 Claims, 6 Drawing Sheets

Figure 5A:
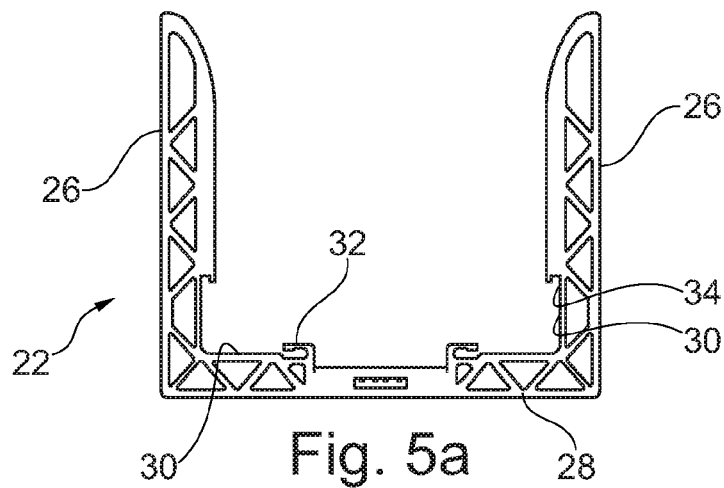
Figure 5B:
Figure 5C:
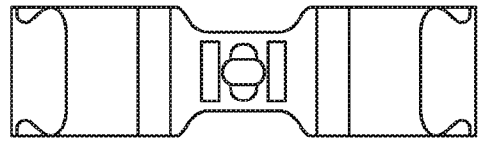

(58) Field of Classification Search
USPC .................................................... 191/12 C
See application file for complete search history.

(56) References Cited

U.S. PATENT DOCUMENTS

| | | | | |
|---|---|---|---|---|
| 5,257,961 A * | 11/1993 | Wehler | .................... | F16G 13/16 428/122 |
| 5,411,443 A | 5/1995 | Meier et al. | | |
| 5,422,157 A * | 6/1995 | Wehler | .................... | B66C 13/12 428/122 |
| 5,649,415 A * | 7/1997 | Pea | .................... | F16G 13/16 191/12 C |
| 6,796,409 B2 * | 9/2004 | Hermey | .................... | H02G 11/006 191/12 C |
| 6,852,052 B2 * | 2/2005 | Jonas | .................... | F16G 13/16 474/144 |
| 7,310,935 B2 | 12/2007 | Worms | | |
| 2002/0136471 A1 * | 9/2002 | Hermey | .................... | H02G 11/006 384/42 |
| 2003/0008740 A1 * | 1/2003 | Jonas | .................... | F16G 13/16 474/144 |
| 2005/0155337 A1 * | 7/2005 | Worms | .................... | F16G 13/16 59/78.1 |
| 2007/0227117 A1 * | 10/2007 | Iwami | .................... | H02G 11/006 59/78.1 |
| 2010/0050589 A1 | 3/2010 | Komiya | | |
| 2010/0155544 A1 * | 6/2010 | Chou | .................... | F16G 13/16 248/55 |
| 2012/0090870 A1 | 4/2012 | Jaeker et al. | | |
| 2012/0304616 A1 * | 12/2012 | Wendig | .................... | H02G 11/006 59/78.1 |
| 2013/0025252 A1 * | 1/2013 | Harada | .................... | H02G 11/006 59/78.1 |
| 2014/0061415 A1 | 3/2014 | Hermey | | |
| 2015/0303665 A1 * | 10/2015 | Kemper | .................... | F16G 13/16 248/55 |

FOREIGN PATENT DOCUMENTS

| | | | |
|---|---|---|---|
| DE | 102006017740 A1 | 12/2006 | |
| DE | 202011100313 U1 * | 12/2011 | ........... H02G 3/0431 |
| WO | 0063584 A1 | 10/2000 | |

OTHER PUBLICATIONS

English language Translation of PCT International Preliminary Report on Patentability/Written Opinion issued Jul. 29, 2014, received in corresponding PCT Application No. PCT/EP13/51353, 10 pgs.

* cited by examiner

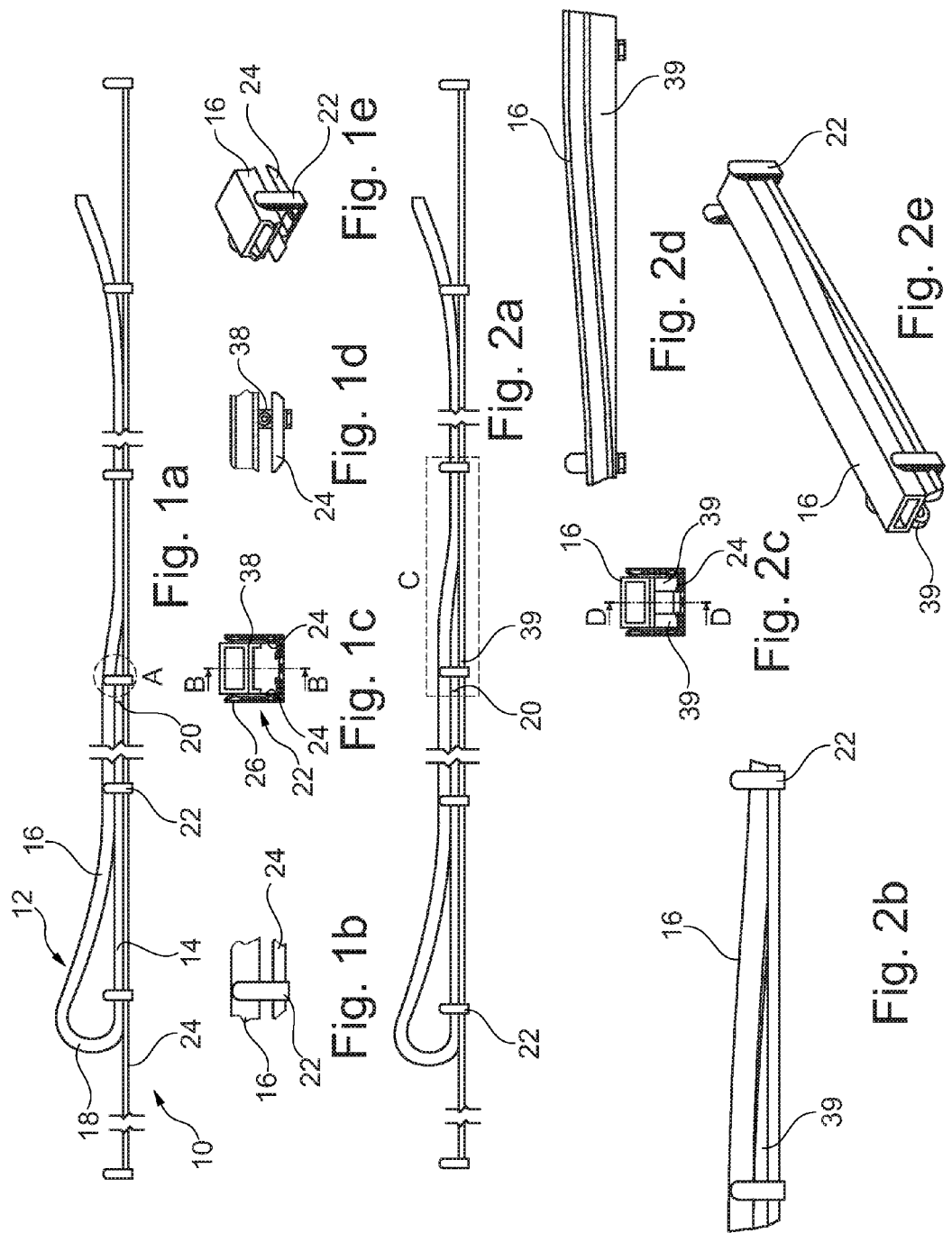

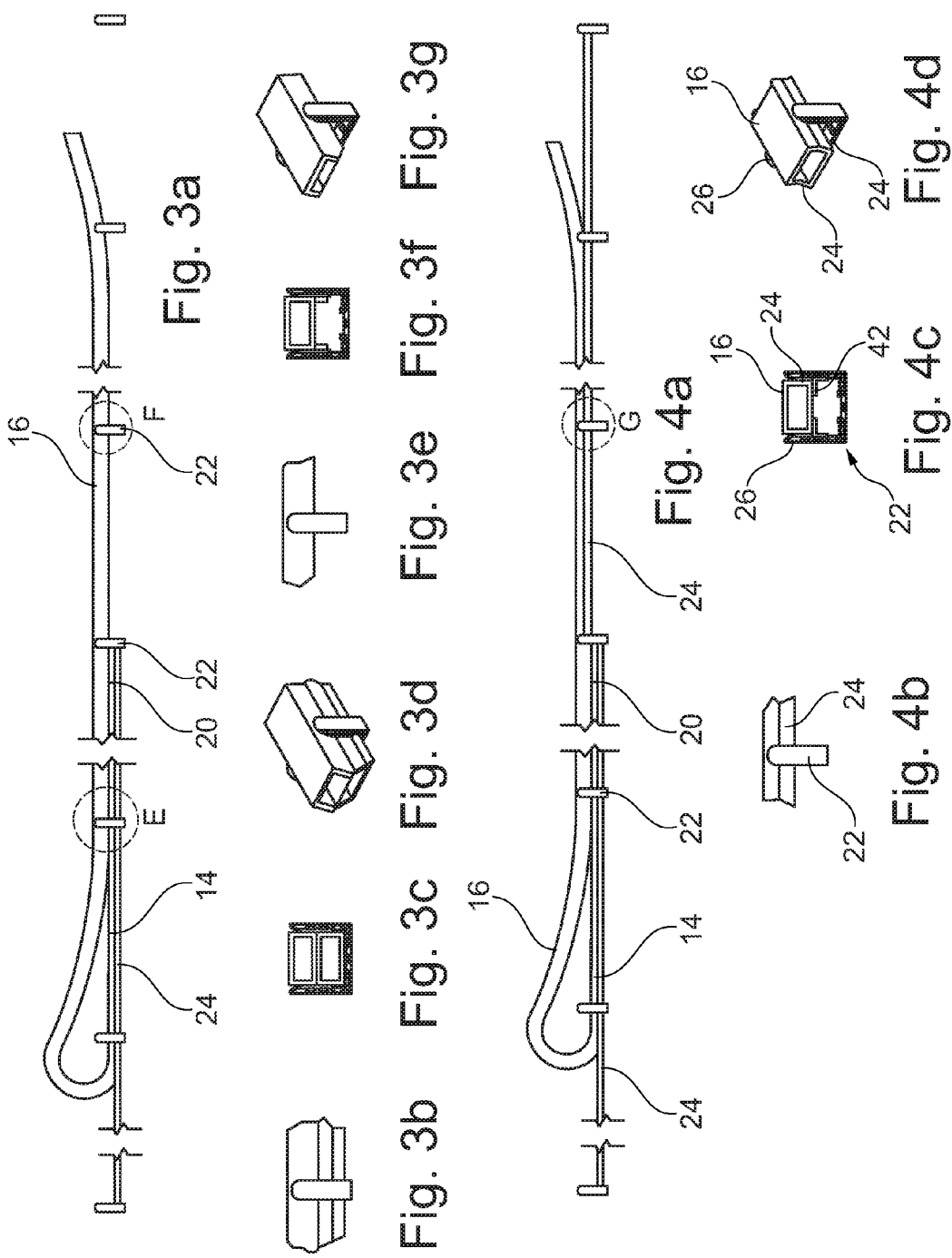

GUIDING DEVICE

The invention concerns a guide device for a line, in particular a power chain which can be turned over in such a way that a portion (upper run) thereof can be positioned over another portion (lower run) thereof and the upper run and the lower run are connected together by an arcuate portion. Such lines or power chains serve to supply moveable machines with power and possibly other operating agents.

Depending on the respective factors involved those guide devices can be quite long so that they entail correspondingly high levels of complication and expenditure, in particular for the material required for their manufacture.

The object of the invention is to improve such guide devices, in particular also with the aim of simplifying them and thus permitting more economical manufacture.

The way in which that object is attained can be summarized to the effect that the guide device is provided with preferably U-shaped holders arranged at spacings from each other, and mounted to the holders at least over a portion of the longitudinal extent of the guide device at both sides are guide rails which bridge over the spacings between the holders and carry the lower run and/or the upper run of the line or power chain.

In that respect the arrangement can be such that the guide rails arranged in paired relationship extend over the substantial part of the total length of the guide device, wherein the guide rails over their entire operative length are at the same level and the upper run over the substantial part of the longitudinal extent is held at the level of the lower run. Those design configurations have the advantage of particular simplicity. In dependence on the respective requirements it may also be possible for the guide rails for the upper run to be arranged higher, in which case then the holders are provided with suitably positioned holding means for the guide rails.

In a further embodiment the arrangement is such that the guide rails are provided only over a part of the longitudinal extent, in particular in such a way that support and guidance by means of the guide rail is implemented predominantly in the region of the lower run and only partial guidance of the upper run is effected in the region thereof, in such a way that the upper run is carried and guided by the holders provided with corresponding guide means.

The guide device according to the invention is distinguished by simplicity of structure so that, also by virtue of the low level of material involvement, this gives greater economy, even when non-corrosive materials are used, which are generally more costly. Thus the guide devices or the components thereof can be made from suitable plastic material, for example using the injection molding process or the extrusion process. The use of plastic material also has the advantage of low weight. In dependence on the respective requirements however the guide device can also be made from other materials, for example steel sheet or aluminum.

A further advantage according to the teaching of the invention is that the guide device can be varied using the basic components forming it in order to take account of the respective requirements in particular in regard to holding and guiding the upper run.

Figure 7A:
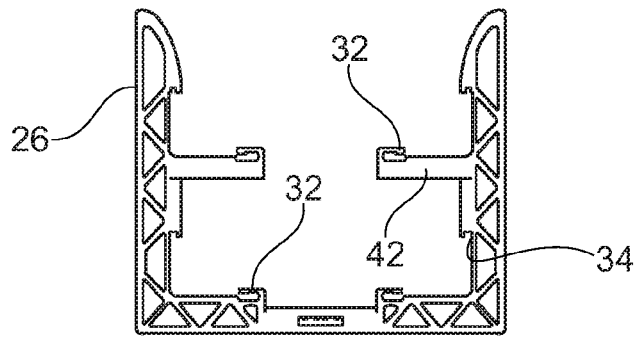
Figure 7B:
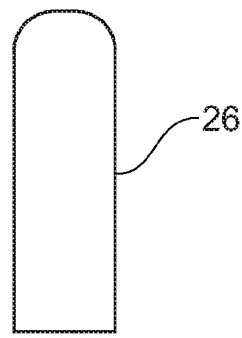
Figure 7C:
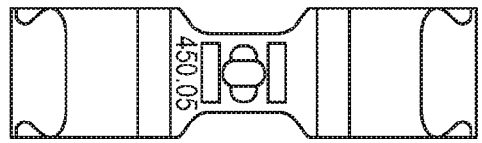
Figure 7D:
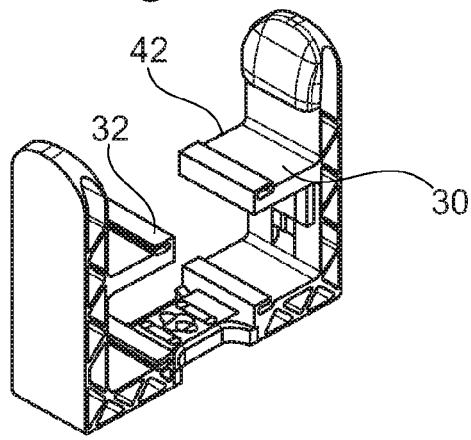
Figure 8A:
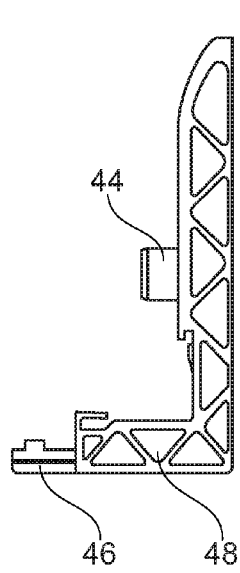
Figure 8B:
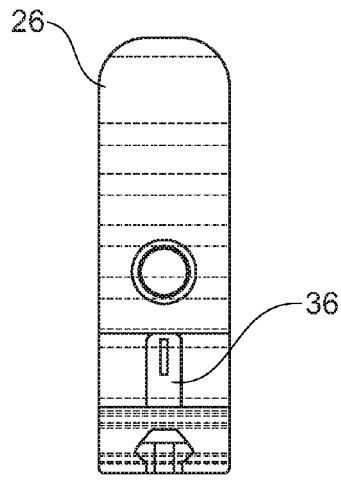
Figure 8C:
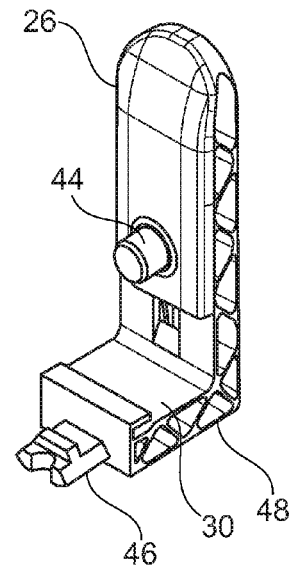

Some embodiments by way of example are partially shown in diagrammatic views in the drawing in which:

FIGS. 1a through 1e show a first embodiment,
FIGS. 2a through 2e show a second embodiment,
FIGS. 3a through 3g show a third embodiment,
FIGS. 4a through 4d show a fourth embodiment,
FIGS. 5a through 5d show the first embodiment of a holder,
FIGS. 6a through 6d show the second embodiment of a holder,
FIGS. 7a through 7d show the third embodiment of a holder, and
FIGS. 8a through 8c show partial views of a fourth embodiment of a holder.

The embodiment illustrated in FIGS. 1a through 1e shows the basic structure thereof. The power chain which accommodates lines required for the operation of a machine (not shown) is so arranged in the guide device 10 that in the usual way there are two mutually superposed portions of which the lower one is referred to as the lower run 14 and the other one is referred to as the upper run 16. The lower run and the upper run are connected together by an arcuate portion 18. The free end 20 of the lower run 14 is fixed in a suitable fashion, for example to the guide device. The other end (not shown) of the power chain is connected to the moveable machine.

The actual guide device comprises upwardly open, U-shaped holders 22 which are arranged at spacings from each other in the longitudinal direction of the guide device 10. The holders 22 comprise lateral flanges 26 and legs 28 formed at a right angle thereon. In their regions adjoining the flanges 26 the legs 28 are in the form of leg portions 48 releasably connected together by a connecting portion 46. In another configuration the leg portions can also be connected together in one piece to provide a leg 28. Mounted to those holders 22 are guide rails 24 which connect them together and which are respectively in the form an angle profile with limbs arranged perpendicularly to each other. The height of the guide rails 24, that is to say their extent along the flanges 26, is less than the height of the flanges 26 and is at most half the height, in particular at most a third and preferably a quarter of the height of the flanges 26 calculated from the top side of the leg 28, as can be seen from FIG. 5a. In addition the height of the guide rails 24 is preferably less than the height of a run of the power chain.

Figure 5D:
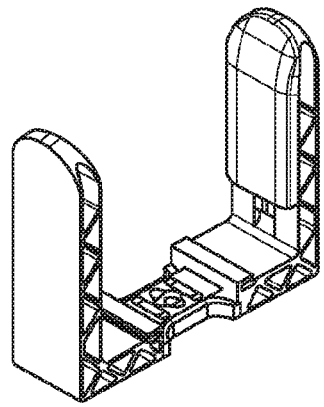
Figure 6A:
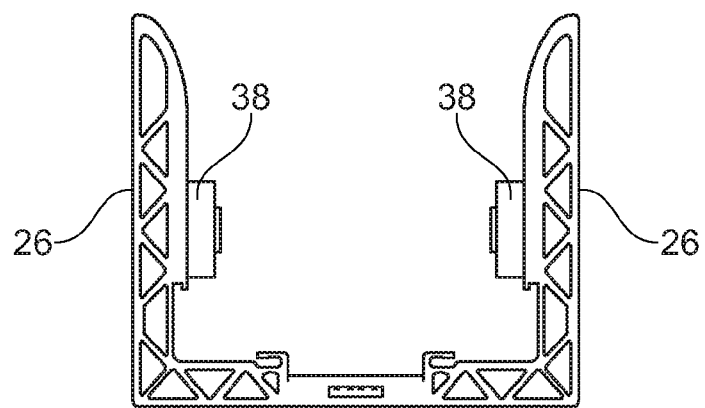
Figure 6B:
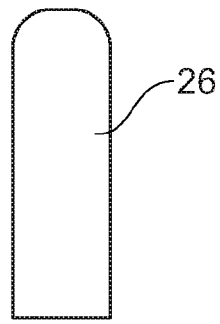
Figure 6C:
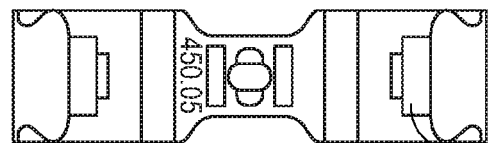
Figure 6D:
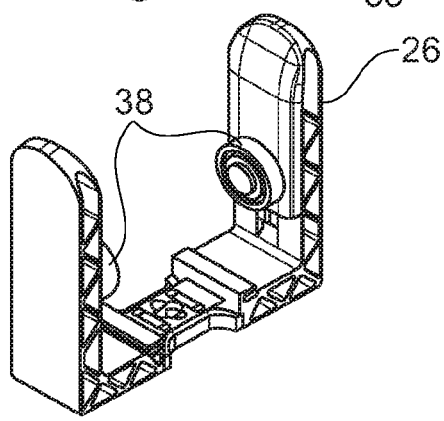

For fitment of those guide rails the U-shaped holders 22 are provided at the bottom at the mutually facing surfaces of the flanges 26 and at the respectively adjoining regions of the leg 28 with a seat 30 for the guide rails 24, as can be seen for example from FIGS. 5a and 5d. As can be seen from those Figures the seat 30 has a recess at the inside of the respective flange 26, of a depth approximately corresponding to the thickness of the limb of the guide rail, that is to be fitted into that recess and that forms the lateral guide means. The portion of the leg 28, that adjoins the flange 26 in question, can also have a recess belonging to the seat 30, of a corresponding depth, for receiving the limb which is supported on the leg 28 and forms the support surface. The recess provided at the inside on the flange 26 and/or at the top side of the leg 28 can form at its respective end an undercut configuration 33 for positively locking insertion of the edge region of the limb in question of the guide rail. Fixing of the guide rail 24 in the respective seat 30 is then effected by projections 32 which are provided on the flange 26 or on the leg 28 respectively and which engage over the edge region of the respective limb of the guide rail fitted into the recess. In that respect the arrangement is desirably such that the surfaces of the guide rails, that are operative for guiding the lines of the power chain, terminate flush with the effective, mutually facing surfaces of the flanges 26 and those of the leg. The undercuts 33 at the ends of the recess or the projections 32 respectively are of such a configuration that the guide rail can be latched therein or therebehind. For example the angle rails with the edge region of the limb bearing against the leg can firstly be pushed under the projection 32 arranged on the leg and then, by pressing the other limb against the inside of the flange 36, can be latched with its edge region in the undercut provided there. For easier insertion of the edge region of the guide rail under the projection 32 arranged on the leg 28 or the flange 26, provided beneath the projection 32 is a groove in the contact surface of the leg or of the flange for the respective limb of the guide rail.

The part of the seat 30 for the guide rail 24, that is respectively disposed on the flange 26, is provided with an abutment 34 carried by a tongue 36 which is so connected to the flange 26 that it is elastically pivotable. In production of the holder 22 from a suitable plastic material, for example by injection molding, the step of forming such a tongue with an abutment is readily possible in one working operation.

The guide device is assembled in such a way that the guide rails 24 and the holder 22 are connected together in the described manner, in which case a guide rail portion can also extend over a plurality of holders of a guide device, depending on the respective factors involved. In that case the abutment 34 provided in the seat region 30 would simply displace the tongue 36 into an inoperative position upon insertion of the guide rail with corresponding deformation. In the other case, when the join between two adjacent portions of the guide rail comes to lie in the region of a holder, the abutment which is then in its operative position as shown in the Figures can facilitate positioning of the guide rail in the holder, by the respective ends thereof being brought to bear against the abutment.

In the embodiment shown in FIGS. 1a through 1e the guide device extends with the guide rails 24 beyond the region delimited by the fixed end 20 of the power chain. In that respect the arrangement is such that the upper run 16 which extends from that fixed end in a direction towards the machine to be supplied is also guided as far as is required by the guide device formed by holders and guide rails and in that respect is disposed at least over parts of its extent between the guide rails 24 which are disposed at the level determined by the lower run 14. For that purpose it is necessary for the upper run to be lowered to the level of the guide rails 24, that is to say to the level of the lower run, in the region adjoining the fixed end of the lower run. For that purpose, in this region providing for the lowering movement, the holders 22 can be provided at their flanges 26 with rollers 38 which engage under and support the longitudinally extending edges of the upper run and thus, with a suitable arrangement of those rollers, they lower the upper run to the level of the guide rails 24, as is shown in particular in FIG. 1a.

Another possibility, with the guide device being of a configuration that is otherwise the same, involves providing a wedge-shaped sliding element 39 behind the region 20 in which the end of the lower run is fixed. The sliding element 29 tapers in a direction towards the machine to be supplied, that is to say it decreases in height, as is shown in FIGS. 2a through 2e. FIG. 2c shows that the sliding element comprises two wedges 38 which are respectively fitted in one of the two guide rails 24 and suitably fixed.

The embodiment of FIGS. 3a through 3g shows a guide device in which the guide rails 24 which receive the lower run 14 extend only over a small travel distance over the fixed end 20 of the lower run in a direction towards the machine to be supplied, so that in this region that is towards the machine to be supplied, the upper run 16 is only partially carried by the U-shaped holders there, more specifically at a level which is above the level of the guide rails. Details are to be found in FIGS. 3b through 3g. In particular FIGS. 3f and 3g show how the two rollers carried by the flanges of the holder 22 engage under the lower run laterally at the longitudinal edges thereof.

The embodiment of FIGS. 4a through 4d corresponds in substantial parts to the embodiments of FIGS. 1a through 1e and FIGS. 2a through 2e insofar as the guide rails thereof extend far over the fixed end 20 of the lower run 15 in a direction towards the machine to be supplied. In this respect however there is a difference insofar as approximately from the end 20 the guide rails 24 are arranged higher than the guide rails for the lower run, as can be seen in particular from the Figure, in particular FIG. 4c. The upper run thus remains approximately at the height level at which it is disposed even where it is carried by the lower run. In particular FIG. 4c further shows that the holders 22 in this portion are provided at the mutually facing sides of their flanges 26 with a respective small leg-like extension 42 which also forms with the respectively associated flange a seat 30 for a guide rail 24. FIGS. 7a and 7d show that these seats 30 are also delimited by projections 32 which permit a simple clipping connection between the guide rail and the holder. In addition those seats can also be provided with an elastically displaceable abutment 34, as was described in connection with the embodiment of FIGS. 1a through 1e.

FIGS. 5a through 5d show an embodiment of the U-shaped holder 22, namely a cross-section, a side view, a plan view and a perspective view.

FIGS. 6a through 6d show a view of a further embodiment which differs from that of FIGS. 5a through 5d in that it is provided at both flanges 26 at the mutually facing sides with guide rollers 38 which support the upper run, either in the region in which the upper run is lowered to the level of the lower run as in FIG. 1a or in the embodiment of FIG. 3a in which the upper run is supported substantially only by the holder zones 20 arranged at spacings, that is to say partially.

FIGS. 7a through 7d show in the corresponding views that embodiment in which the holders are provided with additional legs 42 for guiding the upper run. In that case the holders possibly carry two pairs of guide rails arranged at a vertical spacing.

FIGS. 8a through 8c show a further embodiment of which however the Figures show only a holder portion with flange 26 and portion 48, preferably mounted thereto in one piece, of a leg, that connects the two flanges of the U-shaped holder and carries the horizontal part of the seat 30. Two such holder portions can be assembled to form a U-shaped holder. In this embodiment the two holder portions are releasably connected together by a leg portion (not shown). The connecting portion 46 provided for that purpose engages into a corresponding opening in that leg portion, which is provided with a corresponding opening, wherein the connection between the two flange portions and the leg portion can be implemented by a snap-action fastener. It is naturally also possible for the two holder portions to be so designed that they respectively represent half of a complete U-shaped holder without involving the use of a leg portion which in particular is disposed between them. In each of the two cases, a configuration is possible in which the holder portions having the flange are of mutually coincident configuration in such a way that they are interchangeable, that is to say for example they can be fitted on both sides of the guide device. A divided design for the U-shaped holder can be preferred for example for reasons of greater ease of manufacture, in particular when the holder is produced by means of injection molding, which presents itself as advantageous in particular when using plastic material. In that way it would also be possible to achieve the required elasticity of the cooperating connecting portions without additional measures. Each flange 26 in FIGS. 8a through 8c is provided at the side facing the mutually opposite flange with a cylindrical projection 44 which also serves for supporting the upper run.

What is common to all configurations of the invention is that the vertical extent of the limbs of the guide rails 24, that provide the lateral guidance action, that is to say the height thereof, is markedly less than the vertical extent of the line or power chain, in which respect additional guidance is afforded by the U-shaped holders 22. In comparison with known guide devices that configuration also contributes to a considerable saving on material. The use of the clip connections for mounting the guide rails 24 to the holders 22 promotes easy assembly of the parts forming the guide device, so the assembly operation can possibly be carried out at the location of use.

LIST OF REFERENCES 10 guide device
12 power chain
14 lower run
16 upper run
18 arcuate portion
20 end of the lower run
22 holder
24 guide rail
26 flange
28 leg
30 seat
32 projection
33 undercut
34 abutment
36 tongue
38 roller
39 sliding element
42 leg-like extension
44 cylindrical projection
46 connecting portion
48 leg portion

What is claimed is:

1. A guide device for a line, in particular a power chain, the line having an upper run and a lower run, wherein the line is arrangeable such that the upper run is positionable over the lower run, and the upper run and the lower run are connected together by an arcuate portion, wherein the guide device comprises holders having a U-shaped configuration arranged at spacings from each other in a direction of displacement and two guide rails being mounted to the holders at least over a portion of the longitudinal extent of the guide device and bridging over spacings between the holders and providing support surfaces and lateral guide means, wherein the holders comprise lateral flanges and legs formed at a right angle, and have a configuration to receive the guide rails comprising a recess located at a bottom of mutually facing sides of the lateral flanges and respectively adjoining regions of the legs, both of the recesses forming a seat for the guide rail;
    wherein each of the guide rails are in a form of an angle profile of which one limb provides one of the support surfaces and another limb provides one of the lateral guide means; and
    wherein the recesses have a depth approximately corresponding to a thickness of the limbs of the guide rail, the recesses being provided with an undercut configuration on the flange and on the leg to positively lock in an edge region of one of the limbs of one of the guide rails, such that the guide rails are mounted to the holders by clip connections.

2. The guide device as set forth in claim 1 wherein the limb of each guide rail providing the lateral guide means is perpendicular to the direction of displacement of the line and has an extent no greater than a height of the line or the power chain.

3. The guide device as set forth in claim 1 wherein the holders and/or the guide rails are made from plastic material.

4. The guide device as set forth in claim 1 wherein the holder is provided at the seat for the guide rail with an abutment moveable between a position which projects into the region of the receiving means for the guide rail and an inoperative position.

5. The guide device as set forth in claim 1 wherein the holder is provided with means for guiding the upper run.

6. The guide device as set forth in claim 5 wherein in a portion adjoining the region in which the lower run is fixed are guide means for moving the upper run during the displacement movements out of a position above the lower run into the operative region of the two guide rails disposed at the level of the lower run.

7. The guide device as set forth in claim 6 wherein said guide means is in a form of a wedge-shaped sliding body.

8. The guide device as set forth in claim 5 wherein the means for guiding the upper run are in the form of rollers mounted to the lateral flanges of the holder.

9. The guide device as set forth in claim 5 wherein the flanges of the holders are provided with leg-like extensions at the mutually facing sides of the flanges for guiding the upper run.

10. The guide device as set forth in claim 5 wherein the upper run is only guided by holders in a portion of the longitudinal extent of the guide device in which there is no lower run.

11. The guide device as set forth in claim 5 wherein the holders are provided with guide rails serving to guide the upper run.

12. The guide device as set forth in claim 11 wherein the upper guide rails for guiding the upper run are arranged above a level at which the guide rails for the lower run are disposed.

13. The guide device as set forth in claim 1 wherein the holder is of a multi-part configuration such that the lateral flanges of at least one of the holders is releasably connected together by a separate leg portion.

14. The guide device as set forth in claim 13 wherein the holder is of a two-part configuration such that there are two L-shaped parts which can be releasably connected together in a leg region, optionally with the interposition of an addition leg portion.

15. The guide device as set forth in claim 1 wherein the seat for the guide rail is provided with an abutment elastically moveable between an operative position in which it projects into the seat region and an inoperative position.

* * * * *